US012540633B2

(12) United States Patent
Denis et al.

(10) Patent No.: US 12,540,633 B2
(45) Date of Patent: Feb. 3, 2026

(54) ACTUATOR SYSTEM FOR ARTICULATED MECHANISM

(71) Applicant: SOCPRA SCIENCES ET GENIE S.E.C., Sherbrooke (CA)

(72) Inventors: Jeff Denis, Sherbrooke (CA); Alexandre Girard, Sherbrooke (CA); Jean-Sébastien Plante, Sherbrooke (CA)

(73) Assignee: SOCPRA SCIENCES ET GENIE S.E.C., Sherbrooke (CA)

( * ) Notice: Subject to any disclaimer, the term of this patent is extended or adjusted under 35 U.S.C. 154(b) by 0 days.

(21) Appl. No.: 18/672,688

(22) Filed: May 23, 2024

(65) Prior Publication Data

US 2024/0392813 A1 Nov. 28, 2024

Related U.S. Application Data

(60) Provisional application No. 63/503,795, filed on May 23, 2023.

(51) Int. Cl.

| | |
|---|---|
| ***F15B 7/08*** | (2006.01) |
| ***F15B 15/08*** | (2006.01) |
| ***F15B 15/18*** | (2006.01) |
| *F15B 15/20* | (2006.01) |

(52) U.S. Cl.

CPC ................ *F15B 15/18* (2013.01); *F15B 7/08* (2013.01); *F15B 15/088* (2013.01); *F15B 2015/206* (2013.01); *F15B 2211/20561* (2013.01); *F15B 2211/212* (2013.01); *F15B 2211/27* (2013.01); *F15B 2211/7135* (2013.01)

(58) Field of Classification Search

CPC .... F15B 1/024; F15B 7/00; F15B 7/02; F15B 7/08; F15B 7/10; F15B 9/03; F15B 9/17; F15B 15/088; F15B 15/18

See application file for complete search history.

(56) References Cited

U.S. PATENT DOCUMENTS

| | | | | |
|---|---|---|---|---|
| 3,823,758 A * | 7/1974 | Heese | F15B 15/088 | 92/17 |
| 3,967,447 A * | 7/1976 | Hegel | F15B 7/10 | 91/422 |
| 5,943,860 A * | 8/1999 | Kato | F15B 7/10 | 60/459 |
| 7,464,549 B1 * | 12/2008 | Edelson | F16H 39/16 | 60/536 |

(Continued)

*Primary Examiner* — Michael Leslie

(74) *Attorney, Agent, or Firm* — NORTON ROSE FULBRIGHT CANADA LLP

(57) ABSTRACT

An actuator system for articulated mechanism may have a fluid actuator having a displaceable member operating an output configured to apply an output force to the articulated mechanism. A fluid system may be in fluid communication with the fluid actuator to supply the fluid actuator with motive fluid to contribute to the output force. The fluid system may include a pressure reservoir configured for storing fluid, a pumping device for controlling a pressure of the fluid in the reservoir, and a circuit for directing the fluid from the reservoir to the fluid actuator. An actuator device may be operatively connected to the fluid actuator to apply a variable force to the displaceable member to contribute to the output force.

20 Claims, 7 Drawing Sheets

(56) References Cited

U.S. PATENT DOCUMENTS

| | | | | |
|---|---|---|---|---|
| 8,959,909 | B2 * | 2/2015 | Nishioka | B60T 13/745 60/545 |
| 9,096,115 | B2 * | 8/2015 | Ho | E02F 9/2292 |
| 9,283,949 | B2 | 3/2016 | Saunders et al. | |
| 10,215,199 | B2 | 2/2019 | Cosoli et al. | |
| 10,814,499 | B2 * | 10/2020 | Tanaka | B25J 13/088 |
| 10,925,754 | B2 * | 2/2021 | Goldfarb | A61F 2/6607 |
| 11,274,526 | B2 * | 3/2022 | Deville | E21B 34/14 |
| 11,976,676 | B2 * | 5/2024 | Quan | F15B 1/024 |

* cited by examiner

TABLE II
RMS [AND PEAK] REQUIREMENTS OF MOTOR(S) (M) WHEN LEG(S) ON GROUND (N/KG) FOR ALL TASKS

| | Design A (baseline) | | Design B (proposed) | |
|---|---|---|---|---|
| Task | $M_1$ | $M_2$ | $M_1$ | $M_2$ |
| Walking (1.8 $m\,s^{-1}$) | 6.5 [13.1] | 6.4 [13.7] | 2.3 [7.0] | 2.3 [7.0] |
| Running (4.5 $m\,s^{-1}$) | 9.7 [26.2] | 9.6 [26.4] | 5.1 [13.9] | 5.1 [13.9] |
| Jumping | 6.4 [9.9] | 6.4 [9.9] | 2.5 [4.1] | 2.5 [4.1] |
| Sit-to-stand | 4.1 [6.0] | 4.3 [6.0] | 1.5 [3.7] | 1.6 [3.7] |

FIG. 5

ACTUATOR SYSTEM FOR ARTICULATED MECHANISM

CROSS-REFERENCE TO RELATED APPLICATION

The present application claims the priority of U.S. Patent Application No. 63/503,795, filed on May 23, 2023 and incorporated herein in its entirety by reference.

TECHNICAL FIELD

The application relates to articulated mechanisms, such as exoskeletons, legged robots (e.g., four-legged robots, humanoids, etc), wearable robots, and to an actuator system for such articulated mechanisms.

BACKGROUND

Mobile robotic systems that must bear their own weight, such as wearable robots, exoskeletons and legged robots, need lightweight and efficient actuators to prevent the need for heavy battery packs. They also typically need to be backdrivable for safe and performant interaction with their environment, for instance with the ground for a legged robot or with the user for an exoskeleton. Finally, such useful robot should comply with a wide range of possible force and speed requirements for various tasks and ideally in an efficient way. For instance, locomotion of a given payload (load handling/carrying) at constant speed and constant elevation would theoretically require no mechanical energy but standard electrical gearmotors used in robotic systems lose energy in the form of heat when generating a constant force.

Energy accumulators that can be disconnected have been used in robotic actuators for storing and releasing energy, for instance in legged locomotion leveraging the cyclic motion. Another possible use of energy accumulators is to provide a power boost as they are usually much more power-dense than electric motors. Another use of energy accumulators is to provide a passive source of force that can balance a constant load such as a gravity load without use of external energy. This is the case for instance with static balancing mechanisms that rely on springs to balance the fixed load of an articulated mechanism.

Hydrostatic transmissions have been proposed for wearable robots for placing power sources remotely in a backpack, as opposed to directly on distal joints where the weight is highly burdensome for a user. Some advantages of hydrostatic transmissions include easy routing through complex kinematics, good force density and/or good backdrivability.

SUMMARY

In one aspect, there is provided an actuator system comprising: a fluid actuator having a displaceable member operating an output configured to apply an output force; a fluid system in fluid communication with the fluid actuator to supply the fluid actuator with motive fluid to contribute to the output force, the fluid system including a reservoir configured for storing fluid under pressure, a pressurizing device for increasing a pressure of the fluid in the reservoir, a circuit for directing the fluid from the reservoir to the fluid actuator; and an actuator device operatively connected to the fluid actuator to apply a variable force to the displaceable member to contribute to the output force.

Still further in accordance with the aspect, for example, the fluid actuator is a hydraulic cylinder and the displaceable member is a piston, the actuator device being an electric motor connected to the piston by a piston rod.

Still further in accordance with the aspect, for example, the electric motor and the piston rod form an electro-mechanical actuator device.

Still further in accordance with the aspect, for example, the electro-mechanical actuator device is a ball screw device.

Still further in accordance with the aspect, for example, the fluid actuator is a rotary actuator.

Still further in accordance with the aspect, for example, the actuator device is an electric motor connected to a vane of the rotary actuator.

Still further in accordance with the aspect, for example, the pressure reservoir is part of a spring-loaded cylinder.

Still further in accordance with the aspect, for example, the pressure reservoir is part of a diaphragm reservoir.

Still further in accordance with the aspect, for example, a secondary reservoir may be provided, the pressurizing device pumping fluid from the secondary reservoir to the pressure reservoir.

Still further in accordance with the aspect, for example, the pressurizing device includes a pump.

Still further in accordance with the aspect, for example, the pump includes an electric motor.

Still further in accordance with the aspect, for example, the circuit includes a valve between the pressure reservoir and the hydraulic cylinder to selectively control a supply of the motive hydraulic fluid.

Still further in accordance with the aspect, for example, a hydrostatic transmission may be formed by the fluid actuator and at least one slave actuator for transmission of the output force.

Still further in accordance with the aspect, for example, a plurality of the slave actuator may be present for a single one of the fluid actuator.

Still further in accordance with the aspect, for example, the slave actuator is a slave rotary actuator.

Still further in accordance with the aspect, for example, the slave actuator is a slave cylinder.

Still further in accordance with the aspect, for example, a controller unit may be operatively controlling the pressurizing device and the actuator device.

Still further in accordance with the aspect, for example, the controller unit operatively controls the pressurizing device for the motive hydraulic fluid to maintain a constant pressure.

In accordance with another aspect of the present disclosure, there is provided a system comprising: an articulated mechanism having links interconnected by at least one joint; and an actuator system as above to apply an output force between the links to move the links relative to one another about the at least one joint. The system may be underactuated.

DESCRIPTION OF THE DRAWINGS

Reference is now made to the accompanying figures in which:

FIG. 5 is a table related to FIG. 4 showing the RMS and peak force requirements of motors.

DETAILED DESCRIPTION

Figure 1A:
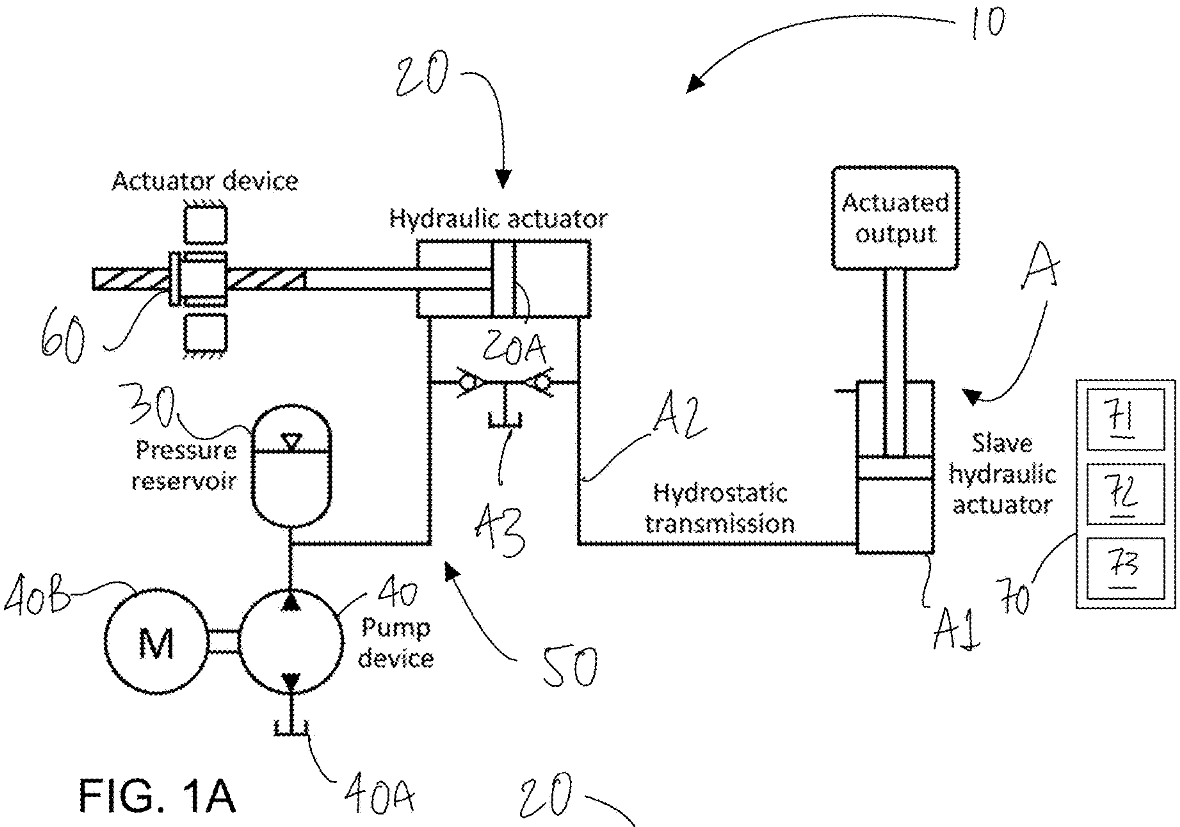
FIG. 1A is a schematic view of an actuator system in accordance with a variant of the present disclosure, featuring a hydrostatic transmission and linear fluid actuators.

Referring to the drawings are more particular to FIG. 1A, an actuator system for articulated mechanisms is generally shown at 10. The actuator system 10 may be used with different types of articulated mechanisms such as exoskeletons, robots including wearable robots, humanoids, four-legged robots, examples of which are provided below. The present disclosure relates a system that has an energy accumulator used to provide a passive source of force that can adjust to a varying payload. Its force is combined with an actuator device. The complete actuator system may be said to 1) have a relatively high force density; 2) have a relatively small mechanical impedance (backdriving force); 3) be efficient to sustain constant loads that may vary during use; 4) provide relatively high peak power; 5) be easily combined with an hydrostatic transmission for remote actuation.

From a general standpoint, the actuator system 10 may have various components, subcomponents, devices, systems. This may include in an embodiment a fluid actuator 20, a fluid system that may have a pressure reservoir 30 (referred to herein as the reservoir 30), a pressure source, such as a pump or like pumping device 40, a fluid circuit 50, an actuator device 60 and/or a controller unit 70, or any combination thereof. In a variant, the actuator system 10 is an hydraulic system using a fluid such as oil for transmission of forces. It is considered to use other types of liquids, including water. The actuator system 10 may also be a pneumatic system or a hybrid system using both hydraulics and pneumatics to transmit forces.

Still referring to FIG. 1A, the fluid actuator 20 is of the type having a displaceable member 20A operating an output configured to apply an output force to the articulated mechanism, the output being illustrated at A, illustrated as being a hydrostatic transmission as an example, the hydrostatic transmission featuring a remote fluid actuator. In the illustrated embodiment, the fluid actuator 20 is a cylinder, and the displaceable member 20A is a piston. The cylinder may be connected to the output A in a master-slave arrangement, with one or more slave cylinders A1 being part of the output A, along with a conduit A2 (e.g., pipe, hose, conduit). The output A may further include a component A3 to prevent the formation of negative gage pressure in the transmission which could lead to air infiltration or to damage to the system.

Figure 1B:
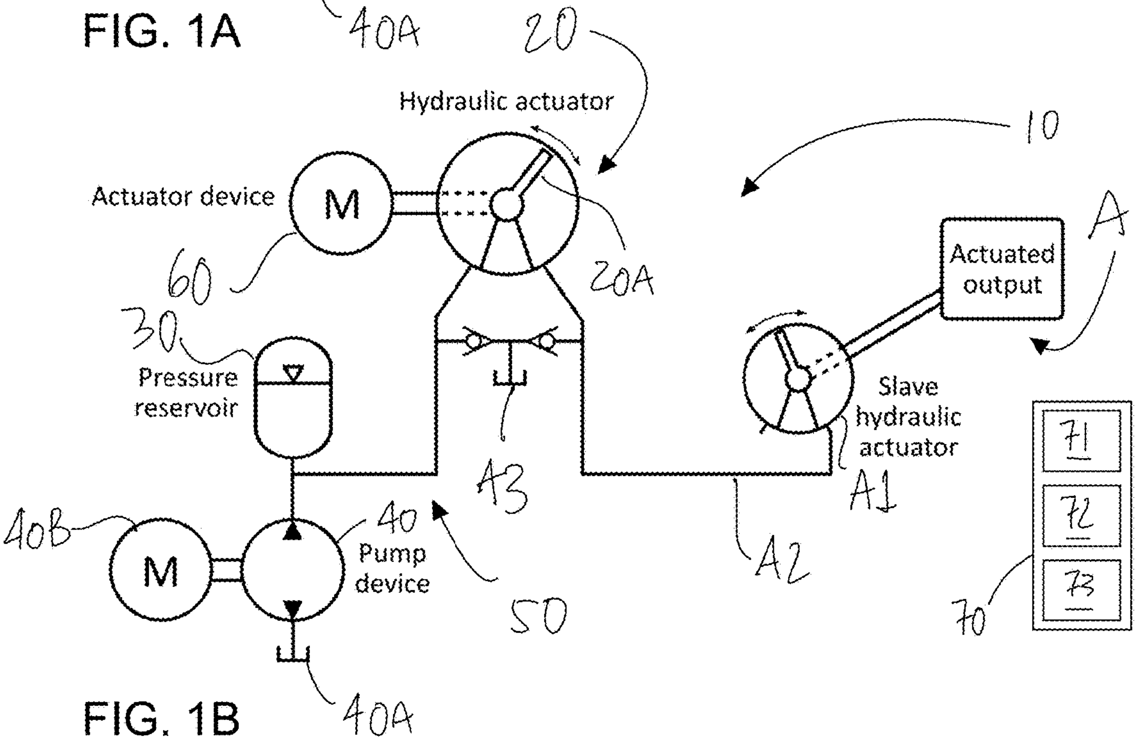
FIG. 1B is a schematic view of an actuator system in accordance with a variant of the present disclosure, featuring a hydrostatic transmission and rotary fluid actuators.

In another embodiment, with reference to FIG. 1B, the fluid actuator 20 is a rotary actuator, using a rotating vane as the displaceable member 20A, instead of the piston of FIG. 1A. The rotary actuator 20 may be connected to the same output A as in FIG. 1A, including with a slave cylinder(s) or a slave rotary actuator (as shown in FIG. 1B), depending on the contemplated use.

A fluid system may be in fluid communication with the fluid actuator 20 to supply the fluid actuator 20 with motive fluid to contribute to the output force. The fluid system may include a pressure reservoir 30 configured for storing fluid under pressure, such as hydraulic fluid. In a variant, the pumping device 40 and the actuator system 10 may be operated to maintain a target pressure, or pressure range, for the fluid in the pressure reservoir 30. A pump device 40 (e.g., a pump, a blower, etc) may be used in conjunction with the pressure reservoir 30 for controlling a pressure of the fluid in the reservoir 30 (e.g., increasing the pressure, decreasing the pressure), and in a fluid circuit 50. The fluid circuit 50 defines fluid communication between the reservoir 30, the pump device 40 and the fluid actuator 20, whereby a fluid pressure is maintained in the fluid system, again toward a target pressure, and/or within a pressure range. Moreover, the reservoir 30 may be sized to enable smaller pressure variations, by having a sufficient volume versus the size of the fluid system, i.e., the displaced volume of the fluid actuator 20. Hence, fluid may be directed from the reservoir 30 to the fluid actuator 20. Thus, the fluid system may contribute to the output force by applying a fluid pressure that can be used to operate the fluid actuator 20, by being applied to one side of the fluid actuator 20. The controller unit 70 can adjust the pressure contribution of the fluid system.

In FIG. 1A, the pumping device 40 is shown in a serial arrangement between the fluid actuator 20 and the reservoir 30, in the fluid circuit 50. However, other configurations are possible. For example, the pumping device 40 may be more generally described as being a pressurizing device to ensure that the fluid in the reservoir 30 is kept at a target pressure or pressure range. The pressurizing device 40 may include a compressor air source, etc, by which a pressure may be applied to a top surface of the fluid in the reservoir 30. Another possibility is that the pumping device 40 is a compressor directly pumping air in the fluid circuit, so that the gas directly applies pressure on the fluid actuator 20. Accordingly, the pumping device 40 may be defined as a device that provides or contributes to providing a motive fluid in the fluid system and hence apply a force in the fluid actuator 20. In another variant, the reservoir 30 includes a biasing member, such as a diaphragm or a spring-loaded piston, that will be used for the fluid system to use the reservoir 30 as potential energy storage. Generally speaking, the reservoir 30 may be a hydraulic accumulator (such as a diaphragm accumulator, a bladder accumulator, etc.).

The pumping device 40 may have its own reservoir, such as reservoir 40A, and may for example be operated by a motor 40B, or by any other type of actuator. The reservoir 40A may act as a buffer to ensure that a suitable amount of fluid remains in the fluid system. Stated differently, the reservoir 40A is a low pressure volume of fluid in order to supply the pump 40 when it is needed to pump more fluid in the reservoir 30, in order to increase the pressure of the reservoir 30.

An actuator device 60 is operatively connected to the fluid actuator 20, and is operated to apply a variable force to the displaceable member 20A to contribute to the output force, on the output A. Stated differently, the output force may be the combination of force from the actuation of the fluid actuator 20 by fluid pressure, and the force from the actuator device 60. In a variant, the force provided by the actuator device 60 varies at higher frequency than the force from the actuation of the fluid actuator 20 by fluid pressure, but the force from actuation of the fluid actuator 20 by fluid pressure is greater than the force from the actuator device 60. In a variant, the actuator device 60 applies the force onto the displaceable member 20A using a different transmission mechanism than the fluid system. For example, as illustrated, the actuator device 60 is a linear actuator having a rod or like output mechanically connected to the displaceable member 20A. Therefore, when actuated, the actuator device 60 adds to the force applied to the displaceable member 20A, such that the total force applied to the displaceable member 20A may be a combination of the forces from the fluid system and from the actuator device 60. In a variant, the actuator device 60 is a ballscrew system converting an electric force (i.e., torque) into a linear force. Other electromechanical actuators may be used, including electromagnetic actuators with magnetically displaced piston, as an example among others. Stated differently, the actuator device 60 provides a mechanical force, an electromechanical force, a magnetic force to the fluid actuator 20, while the fluid actuator 20 uses fluid pressure. It can be said that the nature of the two forces applied to the output 20A differ.

If the fluid actuator 20 is a rotary actuator, it is possible to use an electric motor of any kind as actuator device 60 to transmit torque to the vane of the rotary actuator. The electric motor, or alternatively hydraulic, pneumatic motors, can be in a direct drive connection with the rotary fluid actuator 20, or may be connected to the rotary fluid actuator 20 by a transmission that may provide a reduction ratio. Thus, the actuator device 60 may be an electric motor, a hydraulic motor, a pneumatic motor, and may include a magnetorheological clutch, gear box or like reduction mechanism or transmission.

Figure 1C:
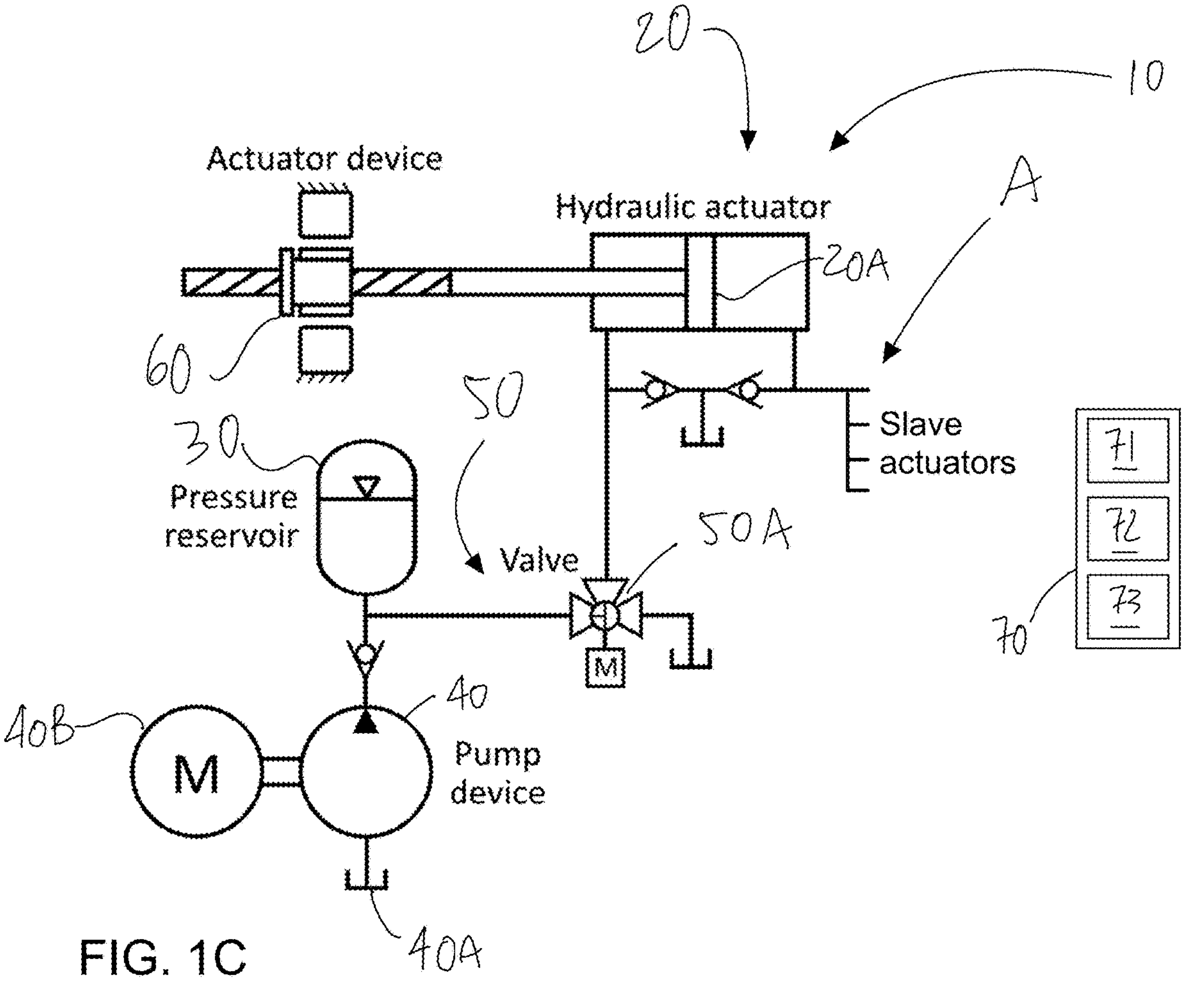
FIG. 1C is a schematic view of the actuator system of FIG. 1A, having valves to decouple parts of the actuator system.

Referring to FIG. 1C, a similar arrangement of the actuator system 10 of FIG. 1A is shown, but with the presence of valve 50A in the fluid circuit 50. The valve 50A may be any appropriate valve, such as solenoid valve. The valve 50A may be used in a variant to decouple the fluid actuator 20 from the output A, for instance to load the fluid system to a higher pressure. As another variant, the valve 50A may be used in a variant to decouple the fluid system from the fluid actuator 20, for instance to load the fluid system to a higher pressure while the actuator device 60 may still apply a force to the output A, though without the assistance from the fluid system. Other such configurations are possible.

For the actuator system 10 to have a low mechanical impedance, the actuator device 60, and any transmission thereof (e.g., reduction gearbox, etc) may be selected to have low mechanical impedance, such that any backdriving force required to oppose to the actuator device 60 remains low as well. For example, the actuator device 60 may not be an autoblocking system, when a counter force is applied against the output A. For example, the screw used in FIG. 1A to convert motor torque into linear force to the fluid actuator 20 may not be an autoblocking system. Another example could include the use of a lightly-geared motor, i.e., motor and gearbox with a limited reduction ratio, to limit the amount of inertia and friction due to the actuator device 60. In other words, if the actuator device 60 is designed to have low mechanical impedance, then the total overall actuator system 10 will typically have low mechanical impedance (because the mechanical impedance of the fluid system itself will be typically very low). This feature is typically a design challenge, i.e. to have a complete actuator system that can generate high forces while having a small mechanical impedance.

Figure 1D:
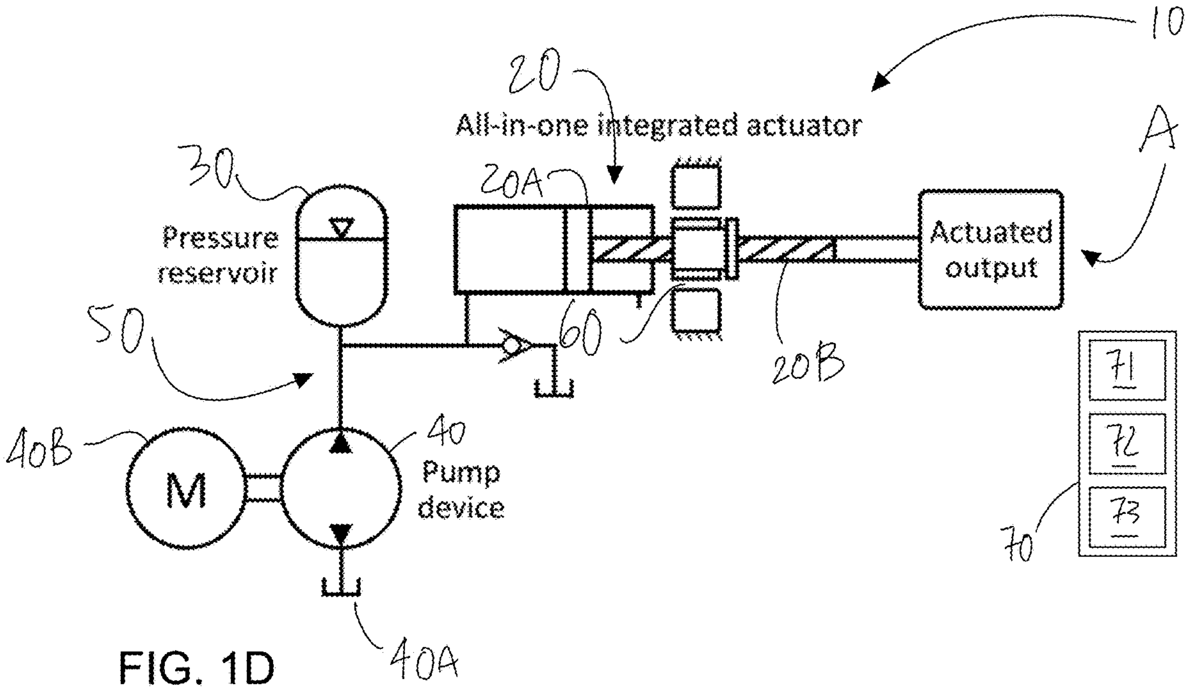
FIG. 1D is a schematic view of the actuator system of FIG. 1A, without a hydrostatic transmission.

Referring to FIG. 1D, the actuator system 10 may be connected directly to an articulated mechanism, i.e., without the hydrostatic transmission. The displaceable member 20A, such as the piston in a linear fluid actuator 20 is connected to the articulated mechanism via a rod 20B. The rod 20B may be a threaded rod receiving a force from the actuator device 60, such as if the actuator device 60 is a ballscrew device. Other configurations are possible. If the fluid actuator 20 is a rotary actuator, the articulated mechanism could be mounted to a shaft thereof, with the actuator device 60 being a motor also coupled to the articulated mechanism (e.g., collinear with the rotary actuator).

Figure 1E:
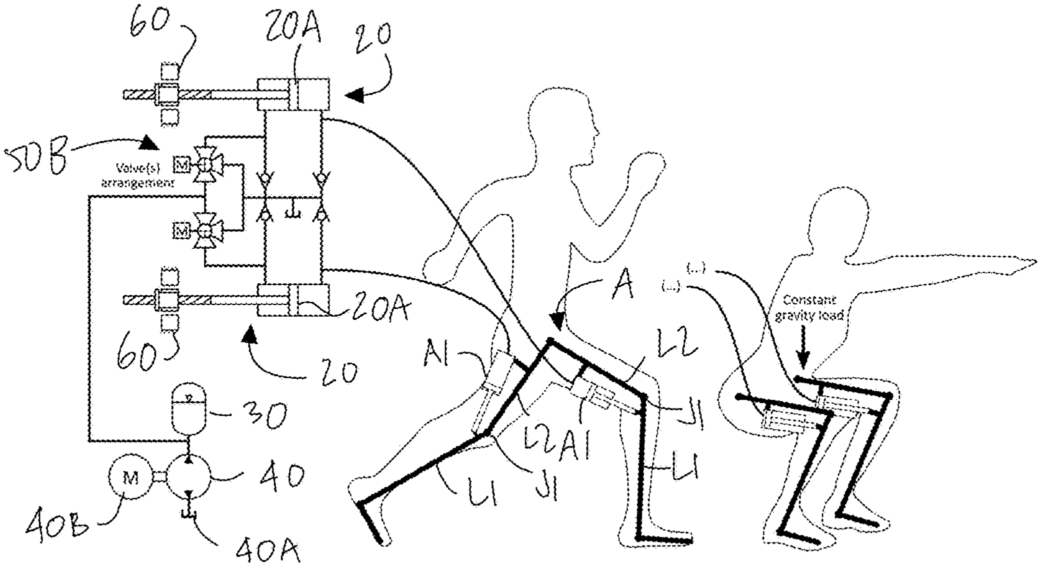
FIG. 1E is a schematic view of the actuator system of FIG. 1A, in a knee exoskeleton.

In FIG. 1E, the articulated mechanism is shown as being an exoskeleton having links interconnected by joints, with slave cylinders A1 connected to respective fluid actuators 20 sharing a common fluid system in a version of the actuator system have a single fluid system for two or more fluid actuators 20. The links are shown as L1 and L2, interconnected by a joint J1. While FIG. 1E shows a rotational joint between links L1 and L2, additional degrees of freedom, translations, etc could be present, including more than a single joint. The slave cylinders A1 may be between links interconnected by one or more joints, as observed from FIG. 1E. A valve arrangement 50B may be operated to feed one or both of the fluid actuators 20. In the illustrated embodiment, the slave cylinders A1 are between two pivotally connected limbs, such as a shank and a tight, with the pivot representative of the knee joint. This is just an example of exoskeleton, as the exoskeleton could be for the arms, for the ankles, etc. A single actuator system 10 may provide force to a plurality of slave cylinders A1.

Figure 1F:
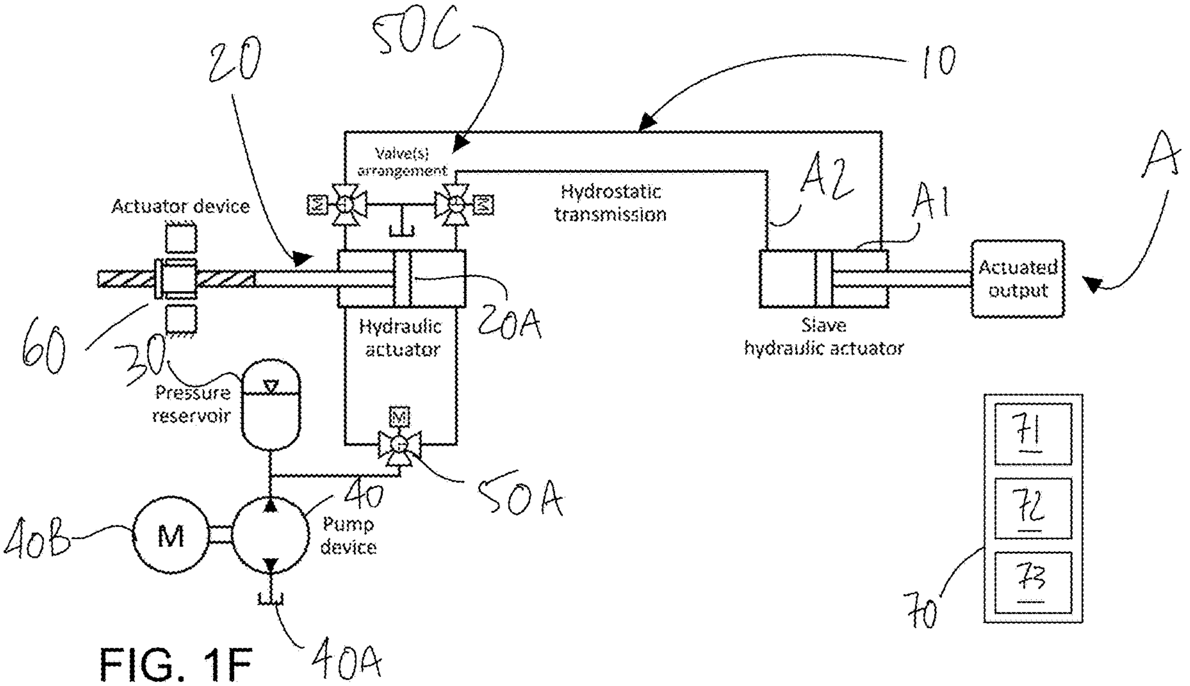
FIG. 1F is a schematic view of an actuator system in a hydrostatic bi-directional configuration.

The actuator system 10 may be part of an underactuated arrangement, with the actuator system 10, providing one degree of actuation shared by numerous outputs A. This is a possibility among others. As another possibility, the fluid system may be connected to both sides of the fluid actuator 20, with appropriate valve arrangement 50C, to be operated in a bi-directional manner. For example, FIG. 1F shows such an hydrostatic configuration, by which the force applied by the fluid actuator 20 may be in either direction, as controlled by the controller unit 70. The valve arrangement 50C may feature for example solenoid valves, or like motorized valves (shown as three-way valves as a possibility), and appropriate network circuitry, to determine the direction of the force applied by the fluid actuator 20. The hydrostatic configuration may be used with the actuator system 10 of FIG. 1B.

The controller unit 70 may include a processing unit 71 and a non-transitory computer-readable memory 72 communicatively coupled to the processing unit and comprising computer-readable program instructions executable by the processing unit 70 for operating the actuator system 10. This may include receiving data from sensors 73 (e.g., pressure sensors, etc) to then operate the pumping device 40 and/or the actuator device 60 to maintain the suitable pressure in the fluid system. The controller unit 70 may also control the valves or valve arrangements (50A, 50B, 50C) or a brake, based on a desired operation workflow. As a possible operation strategy, the fluid system can maintain a steady pressure to assist in supporting a steady load by the articulated mechanism. If the steady load varies relatively slowly with time, the pressure of the fluid system can be adjusted by means of the pumping device 40. The actuator device 60 handles faster variations (or higher frequencies) of force desired at the output. As another possible strategy, the fluid system can be operated for quasi-static/slow-variation/low-frequency loads, while the actuator device 60 is operated for the dynamic/fast-changing/high-frequency loads.

Figure 3:
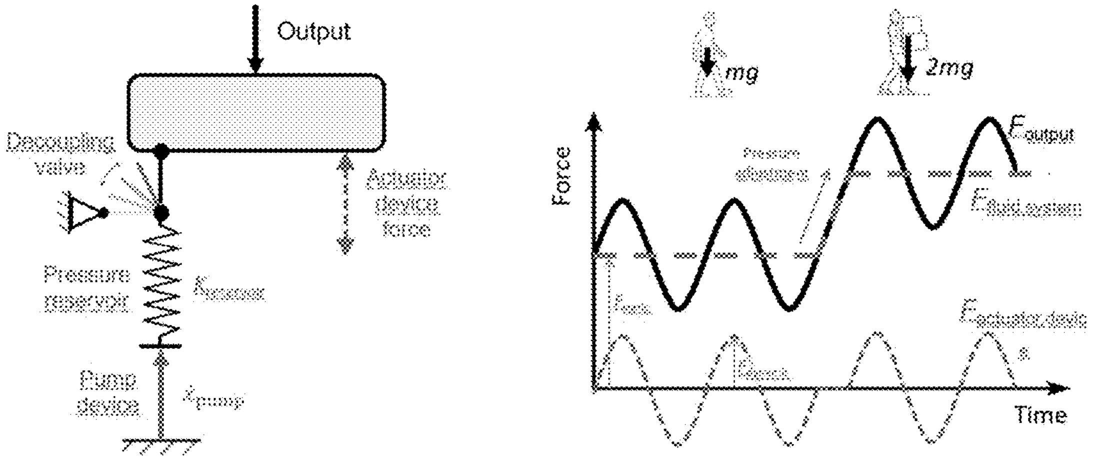
FIG. 3 is a schematic view of a lumped-parameter model and a use case example of the actuator system as in FIG. 1E.

FIG. 3 depicts a lumped-parameter model and an example curve showing how the force generated at the output can be shared through the actuator system. FIG. 3 also gives an insight on how the fluid system can selectively be connected and disconnected from the fluid actuator 20.

The following paragraphs explain some potential benefits of the actuator system 10 of the present disclosure in terms of actuation sizing (weight) and efficiency. The actuator system 10 may be used as part of an exoskeleton. Designing an exoskeleton that supports partially the weight of its user, i.e., that generates a vertical ground reaction force for the right leg, $f_{leg1}$, and the left leg, $f_{leg2}$ (in N/kg or m/s$^2$) is challenging, especially if used for various tasks such as:

Task 1: Walking at 1.8 m/s

Task 2: Running at 4.5 m/s

Task 3: Sit-to-stand or squatting

Task 4: Jumping

Figure 2:
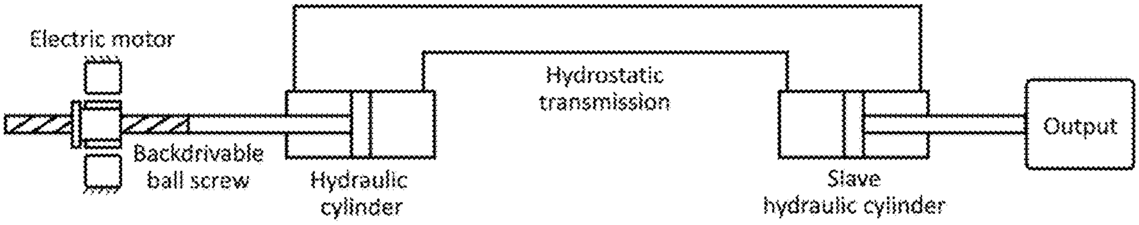
FIG. 2 is a perspective view of a baseline configuration used for analytical comparison.
Figure 4:
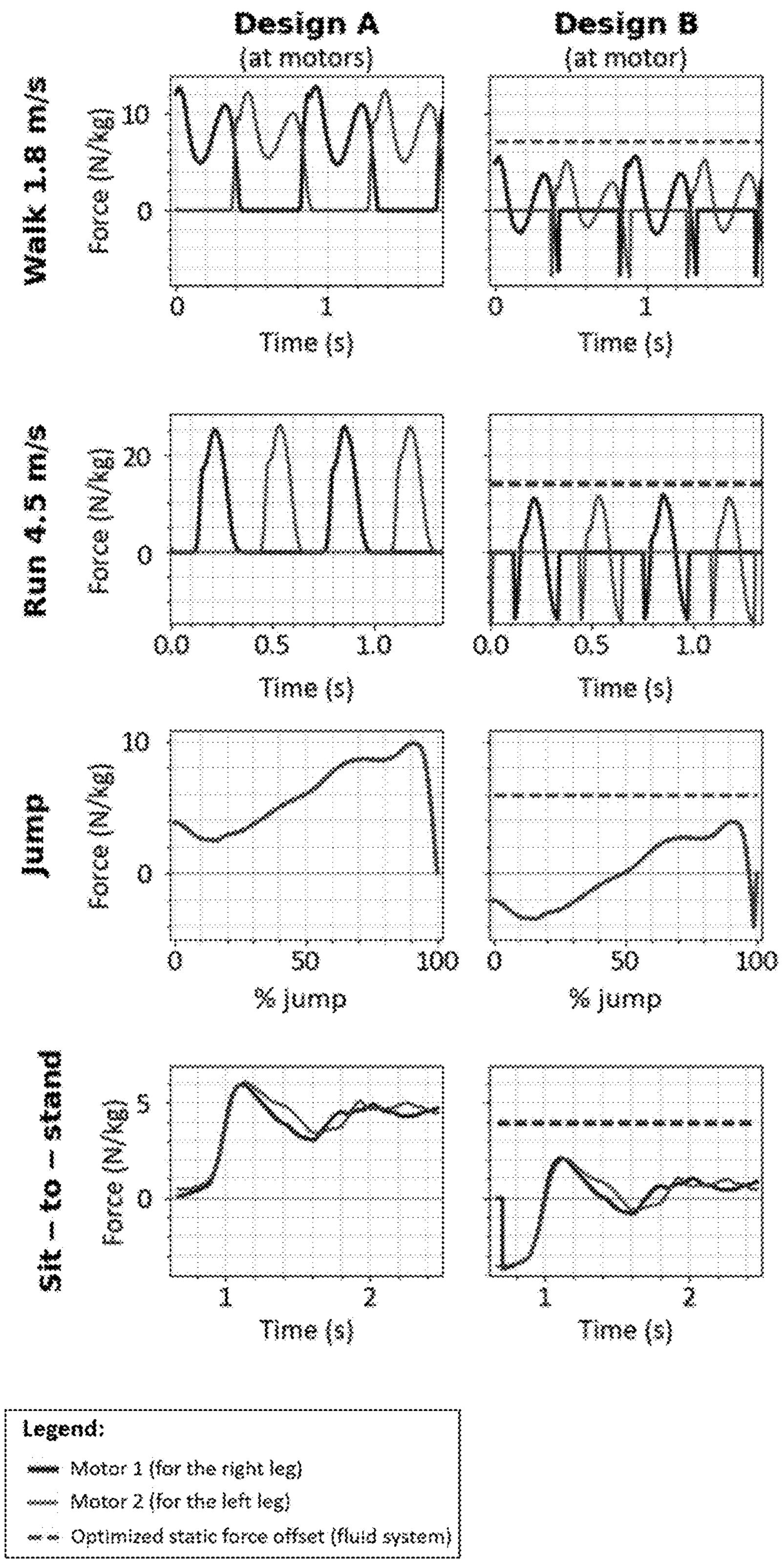
FIG. 4 is a series of graphs illustrating a comparison of a knee exoskeleton with baseline configuration and a knee exoskeleton with an actuator system as in FIG. 1E.

As an non-limiting example, the actuator system 10 is compared to a baseline actuator system to assess the potential benefits of the actuator system 10 for assisting two knees, in FIG. 4:

Design A (baseline): two fluid actuators and two actuator devices, shown in FIG. 2.

Design B (actuator system 10): two fluid actuators 20, two actuator devices 60 and one fluid system for both knees, shown in FIG. 1E. The fluid system would generate a constant force that offsets and decreases the force required at the actuator devices 60.

If the actuator devices 60 used are electric motors, a relevant metric for the energy consumption and the required motor size and weight is the RMS force to be generated. Indeed, motor heating is limited by the required RMS force since it should not exceed its nominal force specification. Also, the efficiency is correlated to how much energy is lost through Joule's power losses given by $P_{Joule}=R(I(t)^2)=RI_{RMS}^2$. Hence, minimizing the RMS force required at the electric motors, $f_{dyn,RMS}$, reduces the main motors size and the energy storage needed.

The RMS force required at the main motors is computed and compared for Designs A and B to track typical vertical ground reaction force profiles done by young adults for all the tasks. For Design A, the two motors should directly track the output force curves of each leg during the stance, meaning that for out-of-phase tasks (walking and running), each motor is used only 25-50% of the gaits. For Design B, the fluid system offsets the dynamic force $f_{dyn}$ required for the two motors by a given static force $f_{stat}$. The total ground reaction force at output is:

$$f_{out}(t) = f_{leg1}(t) + f_{leg2}(t)$$

The optimal static force offset that minimizes the size and heat losses of the motors can be found by solving numerically the following equation:

$$\underset{f_{static}}{\text{minimize}} \underbrace{\sqrt{\frac{1}{T}\int_0^T f_{dyn}(t)^2 dt}}_{f_{dyn,RMS}}$$

-continued $$\text{subject to } \max(f_{dyn}(t)) < 3\ f_{dyn,RMS}$$

$$f_{dyn}(t) = f_{out}(t) - f_{stat}$$

The constraint limits the peak force needed at the motors to three times its continuous rated force. FIG. 4 shows the computed force trajectories required at the motor(s) for Designs A and B, while FIG. 5 provides a table giving an exemplary resulting RMS and peak forces required at the motors:

Relative to Design A, the fluid system of Design B reduces the total motor size and the battery size due to heat losses by a factor of ≈2.8 for walking, by a factor of ≈1.9 for running, by a factor of ≈2.6 for jumping and by a factor of ≈2.7. It also reduces the required motor peak force which also affects the size of the transmission for the motor (e.g. the gearbox). For non-cyclic tasks such as jumping and sit-to-stands, the actual RMS value in fact depends on the duty cycle of the task, i.e how much time there is between two executions of the task. These values are merely provided as examples.

This analysis focused on the motors and battery size. Ideally, assistive robots should not restrain the natural motion of the wearer. An assistive robot that is mechanically transparent (or backdrivable) induces an important design constraint on the actuator device 60, by limiting the acceptable reduction ratio of its transmission. Strong and backdrivable actuator devices 60 are thus typically heavy. In many cases, the motorization mass saved for Design B will outweigh the extra weight due to its additional fluid system. The true mass saving for the whole actuator system (if so) is specific to the application requirements. The use of high-pressure components can save mass for the whole actuator system 10 by reducing the required flow for a given work-per-stroke specification, thus: 1) reducing the fluid volume in the transmission conduit A2, in the pressure reservoir 30, in the fluid actuator 20 and in the tank A3, 2) reducing the size of the conduit for the same viscous losses, and 3) reducing the size of the fluid actuator 20. Custom multi-port valves could reduce the number of valves required too.

The an actuator system 10 may generally be described as having a fluid actuator having a displaceable member operating an output configured to apply an output force; a fluid system in fluid communication with the fluid actuator to supply the fluid actuator with motive fluid to contribute to the output force, the fluid system including a reservoir configured for storing fluid under pressure, a pressurizing device for increasing a pressure of the fluid in the reservoir, and a circuit for directing the fluid from the reservoir to the fluid actuator; and an actuator device operatively connected to the fluid actuator to apply a variable force to the displaceable member to contribute to the output force.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. An actuator system comprising:

a fluid actuator having a displaceable member operating an output configured to apply an output force;

a fluid system in fluid communication with the fluid actuator to supply the fluid actuator with motive fluid to contribute to the output force, the fluid system including a reservoir configured for storing fluid under pressure, a pressurizing device for increasing a pressure of the fluid in the reservoir, and a circuit for directing the fluid from the reservoir to the fluid actuator; and an actuator device operatively connected to the fluid actuator to apply a variable force to the displaceable member to contribute to the output force.

2. The actuator system according to claim 1, wherein the fluid actuator is a hydraulic cylinder and the displaceable member is a piston, the actuator device being an electric motor connected to the piston by a piston rod.

3. The actuator system according to claim 2, wherein the electric motor and the piston rod form an electro-mechanical actuator device.

4. The actuator system according to claim 3, wherein the electro-mechanical actuator device is a ball screw device.

5. The actuator system according to claim 1, wherein the fluid actuator is a rotary actuator.

6. The actuator system according to claim 5, wherein the actuator device is an electric motor connected to a vane of the rotary actuator.

7. The actuator system according to claim 1, wherein the pressure reservoir is part of a spring-loaded cylinder.

8. The actuator system according to claim 1, wherein the pressure reservoir is part of a diaphragm reservoir.

9. The actuator system according to claim 1, further including a secondary reservoir, the pressurizing device directing fluid from the secondary reservoir to the pressure reservoir.

10. The actuator system according to claim 1, wherein the pressurizing device includes a pump.

11. The actuator system according to claim 1, wherein the circuit includes a valve between the reservoir and the fluid actuator to selectively control a supply of the motive hydraulic fluid.

12. The actuator system according to claim 1, further including a hydrostatic transmission formed by the fluid actuator and at least one slave actuator for transmission of the output force.

13. The actuator system according to claim 12, including a plurality of the slave actuator for a single one of the fluid actuator.

14. The actuator system according to claim 12, wherein the slave actuator is a slave rotary actuator.

15. The actuator system according to claim 12, wherein the slave actuator is a slave cylinder.

16. The actuator system according to claim 1, further including a controller unit operatively controlling the pressurizing device and the actuator device.

17. The actuator system according to claim 16, wherein the controller unit operatively controls the pressurizing device for the reservoir to provide the motive fluid to the fluid actuator to oppose against a constant load.

18. A system comprising:

an articulated mechanism having links interconnected by at least one joint; and an actuator system according to claim 1 to apply an output force between the links to move the links relative to one another about the at least one joint.

19. An actuator system comprising:

a fluid actuator having a displaceable member operating an output configured to apply an output force;

a fluid system in fluid communication with the fluid actuator to supply the fluid actuator with motive fluid to contribute to the output force, the fluid system including a reservoir configured for storing fluid under pressure, a pressurizing device for increasing a pressure of the fluid in the reservoir, and a circuit for directing the fluid from the reservoir to the fluid actuator, whereby the motive fluid is supplied by the reservoir directly to the fluid actuator; and an actuator device operatively connected to the fluid actuator to apply a variable force to the displaceable member to contribute to the output force.

20. An actuator system comprising:

a fluid actuator having a displaceable member operating an output configured to apply an output force;

a fluid system including a reservoir configured for storing fluid under pressure, a pressurizing device for increasing a pressure of the fluid in the reservoir, and a circuit for directing the fluid from the reservoir to the fluid actuator; and an actuator device operatively connected to the fluid actuator to apply a variable force to the displaceable member to contribute to the output force;

wherein the reservoir of the fluid system is in fluid communication with the fluid actuator, whereby the reservoir supplies the fluid actuator with motive fluid to contribute to the output force, such that the output force is a combination of a pressure from the reservoir and of the variable force from the actuator device.

* * * * *